United States Patent
Nayak

(10) Patent No.: US 8,825,605 B2
(45) Date of Patent: Sep. 2, 2014

(54) DEDUPLICATION AWARE SCHEDULING OF REQUESTS TO ACCESS DATA BLOCKS

(75) Inventor: Manoj Nayak, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 312 days.

(21) Appl. No.: 13/270,596

(22) Filed: Oct. 11, 2011

(65) Prior Publication Data

US 2013/0091102 A1    Apr. 11, 2013

(51) Int. Cl.
*G06F 17/30*    (2006.01)

(52) U.S. Cl.
USPC ............ 707/662; 707/664; 707/692; 707/694

(58) Field of Classification Search
USPC .................................. 707/662, 664, 692, 694
See application file for complete search history.

(56) References Cited

U.S. PATENT DOCUMENTS

| | | | |
|---|---|---|---|
| 7,908,436 B1 | 3/2011 | Srinivasan et al. | |
| 7,921,077 B2 | 4/2011 | Ting et al. | |
| 7,962,706 B2 | 6/2011 | Davis | |
| 8,171,063 B1 * | 5/2012 | Janakiraman et al. | ........ 707/692 |

OTHER PUBLICATIONS

Costa, et al., "Assessing Data Deduplication Trade-offs from an Energy Perspective," Workshop on Energy Consumption and Reliability of Storage Systems (ERSS), Orlando, Florida (Jul. 2011).
Koller et. al., "I/O Deduplication: Utilizing Content Similarity to Improve I/O Performance," ACM Transactions on Storage (TOS), vol. 6, Iss. 3 (Sep. 2010).

* cited by examiner

*Primary Examiner* — Vincent F Boccio
(74) *Attorney, Agent, or Firm* — LeClairRyan, a Professional Corporation

(57) ABSTRACT

Systems and methods for scheduling requests to access data may adjust the priority of such requests based on the presence of de-duplicated data blocks within the requested set of data blocks. A data de-duplication process operating on a storage device may build a de-duplication data map that stores information about the presence and location of de-duplicated data blocks on the storage drive. An I/O scheduler that manages the access requests can employ the de-duplicated data map to identify and quantify any de-duplicated data blocks within an access request. The I/O scheduler can then adjust the priority of the access request, based at least in part, on whether de-duplicated data blocks provide a large enough sequence of data blocks to reduce the likelihood that servicing the request, even if causing a head seek operation, will not reduce the overall global throughput of the storage system.

21 Claims, 8 Drawing Sheets

DEDUPLICATION AWARE SCHEDULING OF REQUESTS TO ACCESS DATA BLOCKS

FIELD OF THE INVENTION

The systems and methods described herein relate to storage systems, and particularly, to scheduling storage access operations for primary storage having de-duplicated data.

BACKGROUND OF THE INVENTION

A storage system is a processing system adapted to store and retrieve information/data on storage devices, such as disks or other forms of primary storage. The storage system includes a storage operating system that implements a file system to organize information into a hierarchical structure of storage objects, which may be directories or files. These structures organize and track data. For example, each file typically comprises a set of data blocks, and each directory may be a specially-formatted file in which information about other files and directories are stored.

The storage operating system generally refers to the computer-executable code operable on a storage system that manages data access and access requests (read or write requests requiring input/output operations) and supports file system semantics in implementations involving storage systems. The Data ONTAP® storage operating system, available from NetApp, Inc. of Sunnyvale, Calif., which implements a Write Anywhere File Layout (WAFL®) file system, is an example of such a storage operating system implemented as a microkernel within an overall protocol stack and associated storage. The storage operating system can also be implemented as an application program operating over a general-purpose operating system, such as UNIX® or Windows®, or as a general-purpose operating system configured for storage applications.

Storage is typically provided as one or more storage volumes that comprise physical storage devices, defining an overall logical arrangement of storage space. A storage volume is "loaded" in the storage system by copying the logical organization of the volume's files, data, and directories, into the storage system's memory. Once a volume has been loaded in memory, the volume may be "mounted" by one or more users, applications, devices, and the like, that are permitted to access its contents by reading and writing data to the storage system.

An application, server or device may "connect" to the storage system over a computer network, such as a shared local area network (LAN), wide area network (WAN), or virtual private network (VPN) implemented over a public network such as the Internet. Access requests (read or write requests) travel across the network to the storage system for accessing data stored on the storage system.

Optionally the storage system may implement deduplication methods that remove redundant data from the storage system to ensure that only a single instance of the same data is stored on the storage devices. To this end, the deduplication method stores a single instance of the data that is referenced/indexed multiple times. Since redundant data is removed, deduplication of data typically saves storage space. Deduplication typically works by comparing a file to be written to the storage devices with the data blocks currently stored in the storage devices. Any matching blocks are deemed redundant blocks and are deduplicated (i.e., are deleted from or not stored to the storage devices and a reference/index to the address location of the matching stored blocks is produced in their place). Any non-redundant blocks in the received file are written to the storage devices.

Deduplication may be performed by producing a content identifier value of each block that represents the data contents of the block. For example, the content identifier value of a block may be determined using a fingerprint, checksum, or hash operations (such as Message Digest 5, SHA, etc.) that produces a fingerprint, checksum, or hash value (content identifier value) representing the data contents of the block. Regardless of the particular content identifier operation used when two blocks have the same content identifier value, there is a high probability that the two blocks have the same data content as well, and thus one block may be deduplicated. Typically, the content identifier of each block may be produced and stored to a content identifier database during a "gathering" phase. For example, during the gathering phase, each block of each file in a file system may be processed to populate the content identifier database. The content identifier database may then be used to identify redundant blocks and deduplicate blocks as necessary.

As helpful as deduplication is, deduplication can also increase read access times. Deduplicating, by its nature, disrupts the sequential arrangement of a file's data blocks on a disk. Instead of all the file blocks being neatly arranged one after the other within one track of the disk, a deduplicated file block may point to a physical data block at a location that is several tracks away. As such, deduplication can increase the number of times the disk head must move to a different track, and such head moves cause substantial delay during data access. At one point, the increase in access time can, practically, outweigh the benefits of deduplication.

As such, there is a need for a more efficient method of processing data files such that the benefits of deduplication are less undermined by the burdens of increased access time.

SUMMARY OF THE INVENTION

Systems and methods for scheduling requests to access data may adjust the priority of such requests based on the presence of de-duplicated data blocks within the requested set of data blocks. A data de-duplication process operating on a storage device may build a de-duplication data map that stores information about the presence and location of de-duplicated data blocks on the storage drive. An I/O scheduler that manages the access requests can employ the de-duplicated data map to identify and quantify any de-duplicated data blocks within an access request. The I/O scheduler can then adjust the priority of the access request, based at least in part, on whether de-duplicated data blocks provide a large enough sequence of data blocks to reduce the likelihood that servicing the request, even if causing a head seek operation, will not reduce the overall global throughput of the storage system.

More particularly, the systems and methods described herein include storage systems for accessing storage objects of a file system stored on a storage device having de-duplicated data. Such systems may include a de-duplication data map having information that identifies a de-duplicated data block on the storage device and identifies a location on the storage of the de-duplicated data block, and an I/O scheduler for scheduling a plurality of query requests of disk access operations to read data blocks from the storage device. The I/O scheduler may include a dispatch processor for comparing data blocks in one or more query requests to de-duplicated data blocks identified in the de-duplication data map and for prioritizing the order of servicing the query requests as a function of the number of sequential de-duplicated data blocks within the respective query requests.

In certain embodiments, the storage system also includes a de-duplication process having a mapping process for generating the de-duplication data map from data generated by a process for removing duplicate data blocks from the storage device. The de-duplication data map may store, for a respective de-duplicated data block entry, a status flag indicating whether the block is a single block entry or a sequence of de-duplicated data blocks, a reference count indicating a number of file blocks referencing the de-duplicated data block and a physical disk location of the respective blocks or sequence of blocks.

Optionally, the system includes a threshold processor for comparing a set of requested data blocks in a query request to the de-duplication data map to identify a number representing a number of sequential de-duplicated blocks within the query request. Also optionally, the dispatch processor may compare the number of identified de-duplicated data blocks in a request to a minimum threshold number representative of a minimum number of sequential data blocks to trigger a data de-duplication operation.

The system may have a disk analysis processor that may select a set of model work loads, each having one or more query requests, and for comparing the one or more query requests to the de-duplication data map to determine characteristics representative of a typical number of de-duplicated sequential data blocks for query requests in the model workloads.

The system may also have a dispatch processor that prioritizes a query request as a function of a comparison between the number of de-duplicated sequential data blocks in a query request and the typical number of de-duplicated sequential data blocks. Optionally, the file system provides the dispatch processor with a relative priority value representative of a number of requests made by the file system for a particular data block.

In some embodiments, the storage system has a request timer for providing the dispatch processor with a measure of the amount of time a request has been pending.

In another aspect, the systems and methods described herein include methods for accessing storage objects on a storage device having de-duplicated data, that include providing a de-duplication data map having information that identifies a de-duplicated data block in the file system and identifies a storage location of the de-duplicated data block, and scheduling a query request to read data blocks from the storage device by comparing data blocks in the query request to the de-duplicated data blocks identified in the de-duplication map and prioritizing the order of servicing the query request as a function of the number of sequential de-duplicated data blocks within the query request.

BRIEF DESCRIPTION OF THE DRAWINGS

The systems and methods described herein are set forth in the appended claims. However, for purpose of explanation, several embodiments are set forth in the following figures.

DETAILED DESCRIPTION

In the following description, numerous details are set forth for purpose of explanation. However, one of ordinary skill in the art will realize that the embodiments described herein may be practiced without the use of these specific details. In other instances, well-known structures and devices are shown in block diagram form to not obscure the description with unnecessary detail.

The description that follows is divided into two sections. Section I describes a storage system environment in which some embodiments operate. Section II describes a process that schedules access requests based, at least in part, on the number of deduplicated data blocks in the request.

I. Storage System Environment

Figure 1:
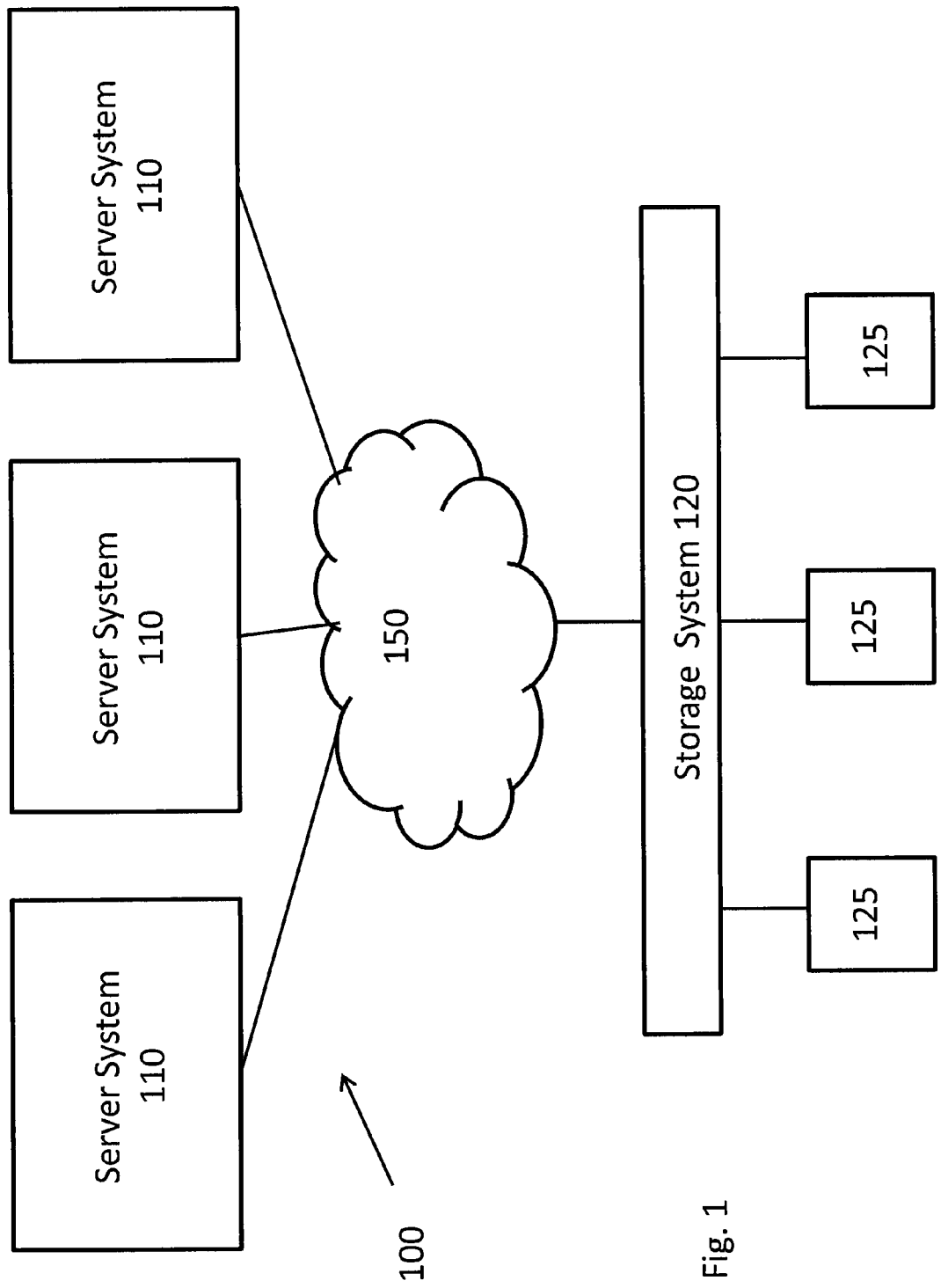
FIG. 1 is a schematic block diagram of an exemplary storage system environment in which some embodiments operate.

FIG. 1 is a schematic block diagram of an exemplary storage system environment 100. The environment 100 comprises a one or more server systems 110 and a storage system 120 (comprising one or more storage devices 125) that are connected via a connection system 150. The connection system 150 may comprise a network, such as a Local Area Network (LAN), Wide Area Network (WAN), metropolitan area network (MAN), the Internet, or any other type of network or communication system between computer systems.

A server system 110 may have a computer system that employs services of the storage system 120 to store and manage data in the storage devices 125. A server system 110 may execute one or more applications that submit read/write requests for reading/writing data on the storage devices 125. Interaction between a server system 110 and the storage system 120 can enable the provision of storage services. That is, server system 110 may request the services of the storage system 120 (e.g., through read or write requests), and the storage system 120 may perform the requests and return the results of the services requested by the server system 110, by exchanging packets over the connection system 150. The server system 110 may issue access requests (e.g., read or write requests) by issuing packets using file-based access protocols, such as the Common Internet File System (CIFS) protocol or Network File System (NFS) protocol, over the Transmission Control Protocol/Internet Protocol (TCP/IP) when accessing data in the form of files and directories. Alternatively, the server system 110 may issue access requests by issuing packets using block-based access protocols, such as the Fibre Channel Protocol (FCP), or Internet Small Computer System Interface (iSCSI) Storage Area Network (SAN) access, when accessing data in the form of blocks.

The storage system 120 may store data in a set of one or more storage devices 125. A storage device 125 may be any suitable storage device and typically is a writable storage device media, such as disk devices, video tape, optical, DVD, magnetic tape, and any other similar media adapted to store information (including data and parity information).

The storage system 120 may employ storage objects to organize and track data. Storage objects may include streams, files, directories or any other suitable storage organization structure. In one particular embodiment, the storage system 120 may implement a file system that logically organizes the data as a hierarchical structure of directories and files on each storage device 125. Each file may be a set of data blocks configured to store data, whereas each directory may be a specially-formatted file in which information about other files and directories are stored. A data block of a file is typically a fixed-sized amount of data that comprises the smallest amount of storage space that may be accessed (read or written) on a storage device 125. The block may vary widely in data size (e.g., 1 byte, 4-kilobytes (KB), 8 KB, etc.). In some embodiments, the file system organizes file data by using mode data structures (sometimes referred to as buffer trees) to represent the files in the file system.

Figure 2:
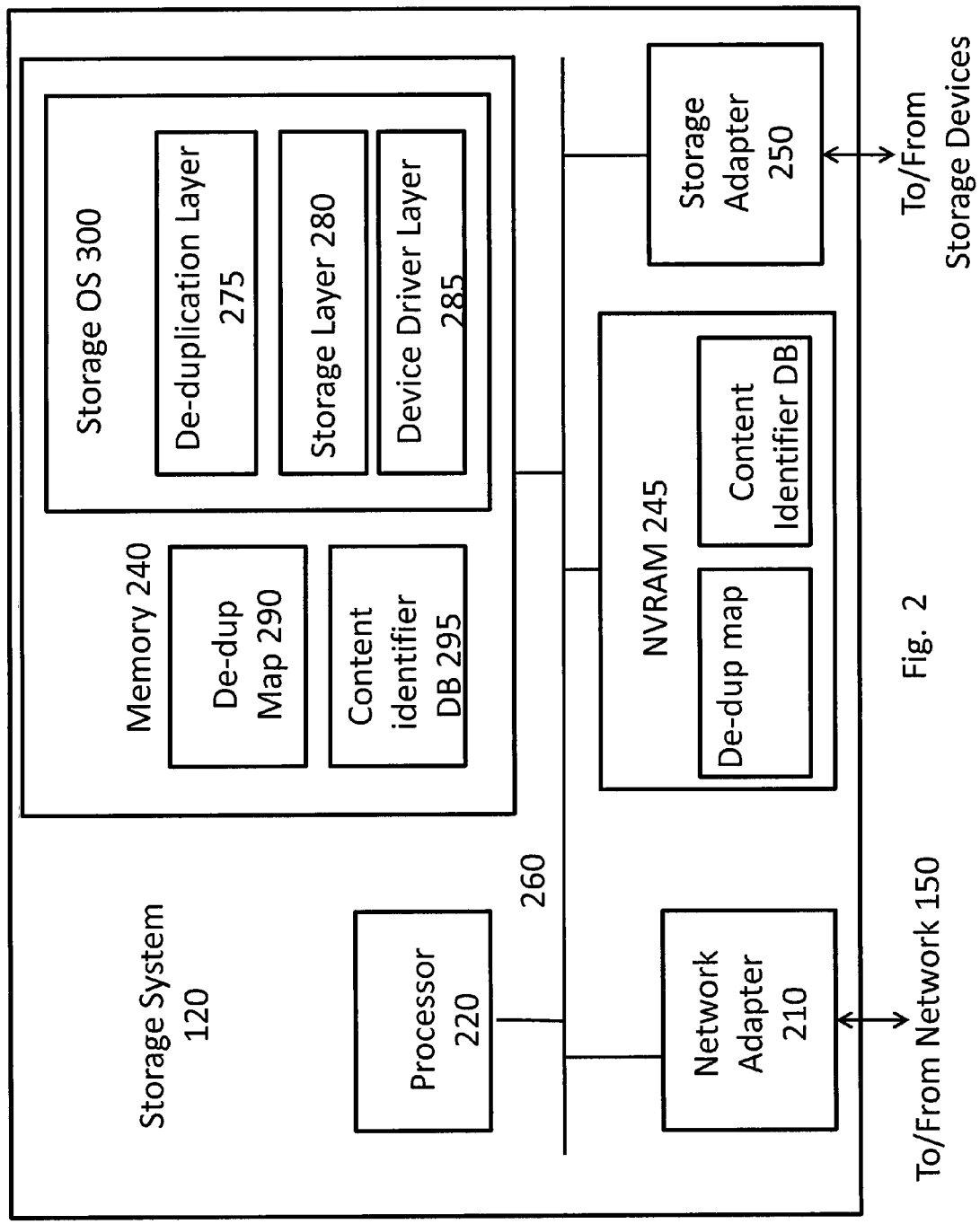
FIG. 2 is a schematic block diagram of a storage system as described herein for use in the storage system environment of FIG. 1.

FIG. 2 is a schematic block diagram of an exemplary storage system 120 that may be employed in the storage system environment of FIG. 1. Those skilled in the art will understand that the embodiments described herein may apply to any type of special-purpose computer (e.g., storage system) or general-purpose computer, including a standalone computer, embodied or not embodied as a storage system. To that end, storage system 120 can be broadly, and alternatively, referred to as a computer system. Moreover, the teachings of the embodiments described herein can be adapted to a variety of storage system architectures including, but not limited to, a network-attached storage environment, a storage area network and disk assembly directly-attached to a server computer. The term "storage system" should, therefore, be taken broadly to include such arrangements.

The storage system 120 comprises a network adapter 210, a processor 220, a memory 240, a non-volatile random access memory (NVRAM) 245, and a storage adapter 250 interconnected by a system bus 260. The network adapter 210 comprises the mechanical, electrical and signaling circuitry needed to connect the storage system 120 to a server system 110 over a computer network 150. The storage system may include one or more network adapters. Each network adapter 210 has a unique IP address and may reference data access ports for server systems 110 to access the storage system 120 (where the network adapter accepts read/write access requests from the server systems 110 in the form of data packets).

The memory 240 comprises storage locations that are addressable by the processor 220 and adapters for storing software program code and data. The memory 240 may comprise a form of random access memory (RAM) that is generally cleared by a power cycle or other reboot operation (e.g., it is a "volatile" memory). In other embodiments, however, the memory 240 may be a non-volatile memory that does not require power to maintain information. The processor 220 and adapters may, in turn, comprise processing elements and/or logic circuitry configured to execute the software code and manipulate the data stored in the memory 240.

The storage system 120 may also include a NVRAM 245 that may be employed as a backup memory that ensures that the storage system 120 does not "lose" received information, e.g., CIFS and NFS requests, in the event of a system shutdown or other unforeseen problem. The NVRAM 245 is typically a large-volume solid-state memory array (RAM) having either a back-up battery, or other built-in last-state-retention capabilities (e.g. a FLASH memory), that holds the last state of the memory in the event of any power loss to the array. Therefore, even if an access request stored in memory 240 is lost or erased (e.g., due to a temporary power outage) it still may be recovered from the NVRAM 245.

The processor 220 executes a storage operating system application 300 of the storage system 120 that functionally organizes the storage system by, inter alia, invoking storage operations in support of a file service implemented by the storage system. In some embodiments, the storage operating system 300 comprises a plurality of software layers, including a deduplication engine/layer 275. A storage layer 280 and a device driver layer 285, that are executed by the processor 220. In one practice, the deduplication engine/layer 275 processes data of a file during the gathering phase of deduplication. However, other de-duplication processes can be used, and de-duplication can take place during read and/or write operations, and thus in real time. Alternatively, de-duplication can take place during back-up operations or when data is being stored on a mirror site. The storage layer 280 and device driver layer 285 process access requests, such as read and write requests, sent by the file system implemented by the storage system 120. The storage layer 280 can organize and administer the various access requests and the device driver layer 285 can direct the operation of the storage devices 125 to record and read data to and from the disk drive.

The software modules, software layers, or threads described herein may comprise firmware, software, hardware or any combination thereof and is configured to perform the processes described herein. For example, the storage operating system may comprise a storage operating system engine comprising firmware or software and hardware configured to perform embodiments described herein. As a further example, the deduplication layer may comprise a deduplication engine comprising firmware or software and hardware configured to perform embodiments described herein. As another example, the scanner thread may comprise a scanner engine comprising firmware or software and hardware configured to perform embodiments described herein. Portions of the storage operating system 300 are typically resident in memory 240 however various computer readable media, may be used for storing and executing program instructions pertaining to the storage operating system 300.

In some embodiments, a deduplication data map structure 290 and content identifier database 295 are also resident in memory 240. In other embodiments, the deduplication data map structure 290 and content identifier database 295 may also be resident in NVRAM 245 or stored on a storage device 125 (e.g., stored on an aggregate or volume in a metadata section not accessible to users). As discussed below, in some embodiments, the deduplication map 290 is produced and created by the deduplication layer 275 to record the presence of deduplicated data on the storage disks 125. The deduplication layer 275 can use gatherer threads to check the content of each data block in a file. To that end, the deduplication layer 275 can use a hash algorithm to hash the contents of a data block and create a finger print or other identifier that can be stored in the content identifier database 295. The content identifier database 295 may then be used to identify redundant data blocks in the files of the file system and deduplicate data blocks as necessary.

The storage adapter 250 cooperates with the storage operating system 300 executing on the storage system 120 to access data requested by the server system 110. The data may be stored on the storage devices 125 that are attached, via the storage adapter 250, to the storage system 120 or other node of a storage system as defined herein. The storage adapter 250 includes input/output (I/O) interface circuitry that couples to the storage devices 125 over an I/O interconnect arrangement, such as a conventional high-performance, Fibre Channel serial link topology. In response to an access request received from a server system 110, data may be retrieved by the storage adapter 250 and, if necessary, processed by the processor 220 (or the adapter 250 itself) prior to being forwarded over the system bus 260 to the network adapter 210, where the data may be formatted into a packet and returned to the server system 110.

The storage devices 125 may comprise disk devices that are arranged into a plurality of volumes, each having an associated file system. In some embodiments, the storage devices 125 comprise disk devices that are configured into a plurality of RAID (redundant array of independent disks) groups whereby multiple storage devices 125 are combined into a single logical unit (i.e., RAID group). In a typical RAID group, storage devices 125 of the group share or replicate data among the disks which may increase data reliability or performance. The storage devices 125 of a RAID group are configured so that some disks store striped data and at least one disk stores separate parity for the data, in accordance with a preferred RAID-4 configuration. However, other configurations (e.g. RAID-5 having distributed parity across stripes, RAID-DP, etc.) are also contemplated. A single volume typically comprises a plurality of storage devices 125 and may be embodied as a plurality of RAID groups.

The systems and methods that are described herein for providing disk access scheduling through a process that evaluates and sets scheduling based, at least in part, on the deduplication state of the primary storage will be described in connection with a storage operating system 300 used with the exemplary storage system 120. However, it is expressly contemplated that the principles of the embodiments described herein can be implemented using a variety of alternative storage operating system architectures. As discussed above, the term "storage operating system" as used herein with respect to a storage system generally refers to the computer-executable code operable on a storage system that implements file system semantics (such as the above-referenced WAFL®) and manages data access. In this sense, Data ONTAP® software is an example of such a storage operating system implemented as a microkernel. The storage operating system can also be implemented as an application program operating over a general-purpose operating system, such as UNIX® or Windows®, or as a general-purpose operating system with configurable functionality.

Figure 3:
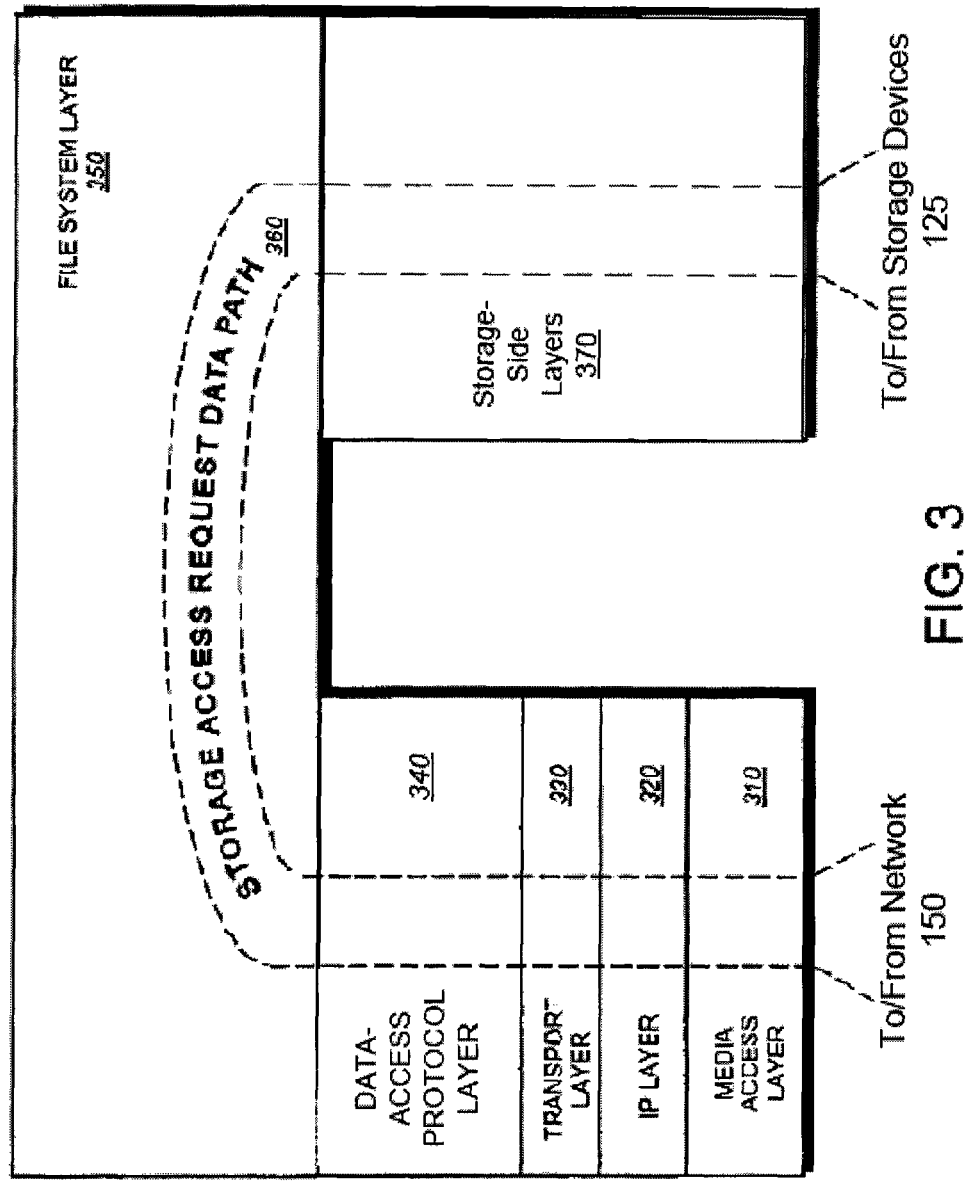
FIG. 3 shows a conceptual diagram of an exemplary file system.

As shown in FIG. 3, the storage operating system 300 comprises a set of software layers that form an integrated protocol software stack. The protocol stack provides data paths 360 for server systems 110 to access data stored on the storage system 120 using data-access protocols. The protocol stack includes a media access layer 310 of network drivers (e.g., an Ethernet driver). The media access layer 310 interfaces with network communication and protocol layers, such as the Internet Protocol (IP) layer 320 and the transport layer 330 (e.g., TCP/UDP protocol). The IP layer 320 may be used to provide one or more data access ports for server systems 110 to access the storage system 120. In some embodiments, the IP layer 320 layer provides a dedicated private port for each of one or more remote-file access protocols implemented by the storage system 120.

A data-access protocol layer 340 provides multi-protocol data access and, for example, may include file-based access protocols, such as the Hypertext Transfer Protocol (HTTP) protocol, the NFS protocol, the CIFS protocol, and so forth. The storage operating system 300 may include support for other protocols, such as block-based access protocols. Such protocols may include, but are not limited to, the direct access file system (DAFS) protocol, the web-based distributed authoring and versioning (WebDAV) protocol, the Fibre Channel Protocol (FCP), the Internet small computer system interface (iSCSI) protocol, and so forth.

The storage operating system 300 may manage the storage devices 125 using storage layers, such as storage layer 280 depicted in FIG. 2. As shown in FIG. 3, the storage layer 280 may implement a storage protocol (such as a RAID protocol) and a device driver layer that implements a device control protocol (such as small computer system interface (SCSI), integrated drive electronics (IDE), etc.). Bridging the storage layers 370 with the network and protocol layers is a file system layer 350 of the storage operating system 300.

In an illustrative embodiment, the file system layer 350 implements a file system having an on-disk format representation that is block-based using mode data structures to describe the files. The file system layer 350 assigns, for each file, a unique file identifier (mode number) and an associated mode data structure. The file system 350 may store and maintain an mode file that contains and indexes (by file identifier/inode number) the modes of the various files. In response to receiving a file-access request (containing an external file handle) from a server system 110, the file system 350 generates operations to load (retrieve) the requested data from storage devices 125 (if it is not resident in the storage system's memory 240). The external file handle in the access request typically identifies a file or directory requested by the server system 110. Specifically, the file handle may specify a generation number, mode number and volume number corresponding to the requested data. If the information is not resident in the storage system's memory 240, the file system layer 350 indexes into the mode file using the received mode number to access the appropriate mode data structure entry for the identified file and retrieve file location information (e.g., logical block number) from the mode data structure.

The file system layer 350 then passes the logical block number to the appropriate driver (for example, an encapsulation of SCSI implemented on a fibre channel interconnection) of the device driver layer 385. The device driver layer 385 accesses the appropriate blocks from the storage devices 125 and loads the requested data in memory 240 for processing by the storage system 120. Upon successful completion of the request, the storage system (and storage operating system) returns a response (e.g., a conventional acknowledgement packet defined by the CIFS specification) to the server system 110 over the network 150.

It should be noted that the software "path" 360 through the storage operating system layers described above needed to perform data storage access for the requests received at the storage system may alternatively be implemented in hardware or a combination of hardware and software. That is, in an alternative embodiment, the storage access request path 360 may be implemented as logic circuitry embodied within a field programmable gate array (FPGA) or an application specific integrated circuit (ASIC). This type of hardware implementation may increase the performance of the file service provided by storage system 120 in response to a file system request packet issued by server system 110. Moreover, in a further embodiment, the processing elements of network and storage adapters 210 and 250 may be configured to offload some or all of the packet processing and storage access operations, respectively, from processor 220 to thereby increase the performance of the data access service provided by the storage system 120.

In some embodiments, the storage operating system 300 also comprises a deduplication layer 275 that operates in conjunction with the other software layers and the file system of the storage operating system 300. For example, the deduplication layer 275 may reside between the file system layer 350 and the storage layer 370 of the storage operating system 300. In other embodiments, the deduplication layer 275 may reside in or near other layers of the storage operating system 300 (e.g., may reside within the file system layer 350). In some embodiments, the deduplication layer 275 may be pre-included in storage operating system 300 software. In other embodiments, the deduplication layer 275 may comprise an auxiliary plug-in type software module that works with the storage operating system 300 to enhance its functions. As such, the deduplication layer 275 may be imposed upon an existing storage operating system 300 and file system 350 to provide deduplication of data as described herein.

II. Deduplication Aware Scheduling of Disk Access Requests.

The storage system 120 may implement deduplication methods when storing data on the storage devices 125. Deduplication methods may be used to remove redundant data and ensure that only a single instance of the same data is stored on the storage devices 125. Rather than storing multiple copies of the same data, a single instance of the data is stored and referenced/indexed multiple times. Deduplication of data may be applied at any level, for example, across a single storage device 125 or volume (where redundant data within the single storage device 125 or volume are removed), across multiple storage devices 125 or volumes (where redundant data within multiple storage devices 125 or volumes are removed), across the entire storage system 120 (where redundant data within the storage system 120 are removed), across multiple storage systems 120 (where redundant data within the multiple storage systems 120 are removed), and so forth. Deduplication of a redundant block may comprise deleting from or not storing the redundant block to the storage devices and, producing in their place, an index to the address location of the corresponding matching stored blocks (the index being produced, for example, in the mode data structure for a file). Since redundant data blocks are removed, deduplication of data typically saves storage space.

Deduplication may be performed by producing a content identifier value of each block that represents the data contents of the block. For example, the content identifier value of a block may be determined using a fingerprint or checksum operation that produces a fingerprint or checksum value representing the data contents of the block. When two blocks have the same fingerprint or checksum value, there is a high probability that the two blocks have the same data content as well, and thus one block may be deduplicated. Typically, the content identifier of each block may be produced and stored to a content identifier database 295 during a "gathering" phase of deduplication. For example, during the gathering phase, each block of each file in a file system may be processed to populate the content identifier database 295. The content identifier database 295 may then be used to identify redundant blocks and deduplicate blocks as necessary.

Figure 4:
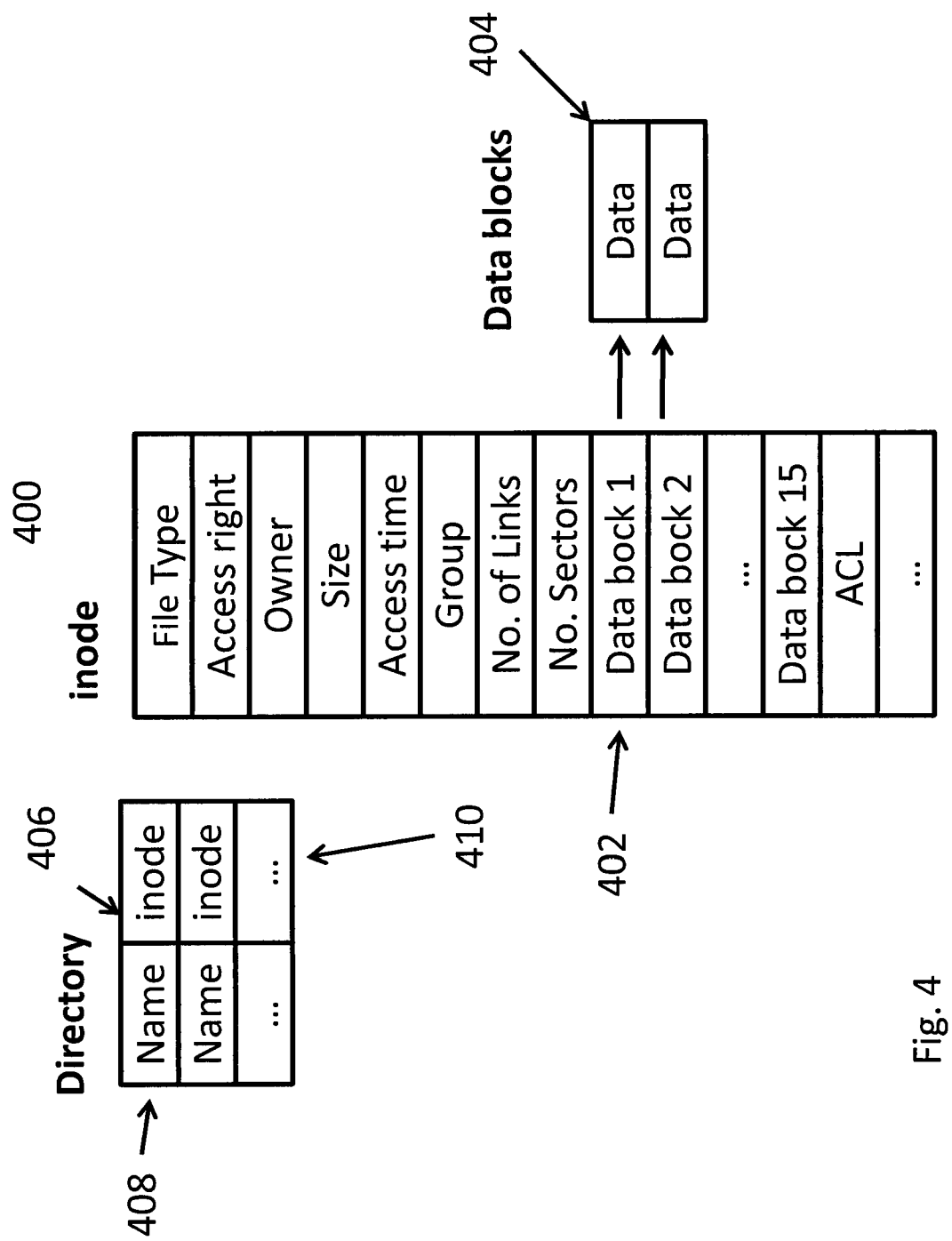
FIG. 4 is a conceptual diagram of an exemplary mode data structure representing a file.

Deduplication reduces the redundant data stored on a disk and therefore reduces the redundant storage of data, freeing up storage space for other uses. The deduplication process implemented by the deduplication layer 275 is typically transparent to the file system layer 350. The file system layer 350 operates on mode file structures such as the mode file structure depicted in FIG. 4. FIG. 4 presents a conceptual diagram of an mode data structure (buffer tree) representing a file. The mode data structure 400 may comprise an internal representation of data blocks for a file loaded into the memory and maintained by the file system 350. An mode data structure 400 for a file may store information about the respective file such as the file type, access rights, the owner of the file, the size of the file, the last time it was accessed, any groups it belongs to and other information. The bulk of the mode 400 is made up of data blocks depicted as data blocks 402. The file data blocks 402 are separately numbered and, in the depicted embodiment, are sequentially numbered. The data blocks 402 point to the physical location of data blocks 404 stored on the primary storage such as the storage devices 125. As such the mode 400 provides the file system 350 with an abstraction of a data file that includes a series of file blocks 402 that point to the physical location of the data blocks 404 that store the data that the file block 402 represents.

FIG. 4 also depicts that mode structures 400 may be used to set up directory files 406. Each directory file 406 can store one or more file names 408 with an associated mode 410 that points to the mode structure for the respective file, such as the depicted mode structure 400

During the data deduplication process the gatherer thread accesses the mode 400 of a particular file and examines each data block 402 within the file and will detect duplicate data blocks 404 by, for example, using the check sum approach described above. During this approach, the gatherer thread accesses for each file block 402 the physical block 404 on the disk 125 that stores the actual data. Typically, it is the actual data associated with the file data block 402 that the gatherer thread examines. The gatherer thread can, in one embodiment, run a check sum operation on the data in data block 404 and compare the check sum for that data block 404 against the earlier determined check sums stored in the content identifier database 295. If a match is found, the deduplication layer 275 can eliminate the redundant data block 404, and set the respective file data block 402 to point to the stored instance of the data block 404. The stored data block 404 is referenced multiple times, and may be descried as a deduplicated data block, storing deduplicated data.

Figure 5:
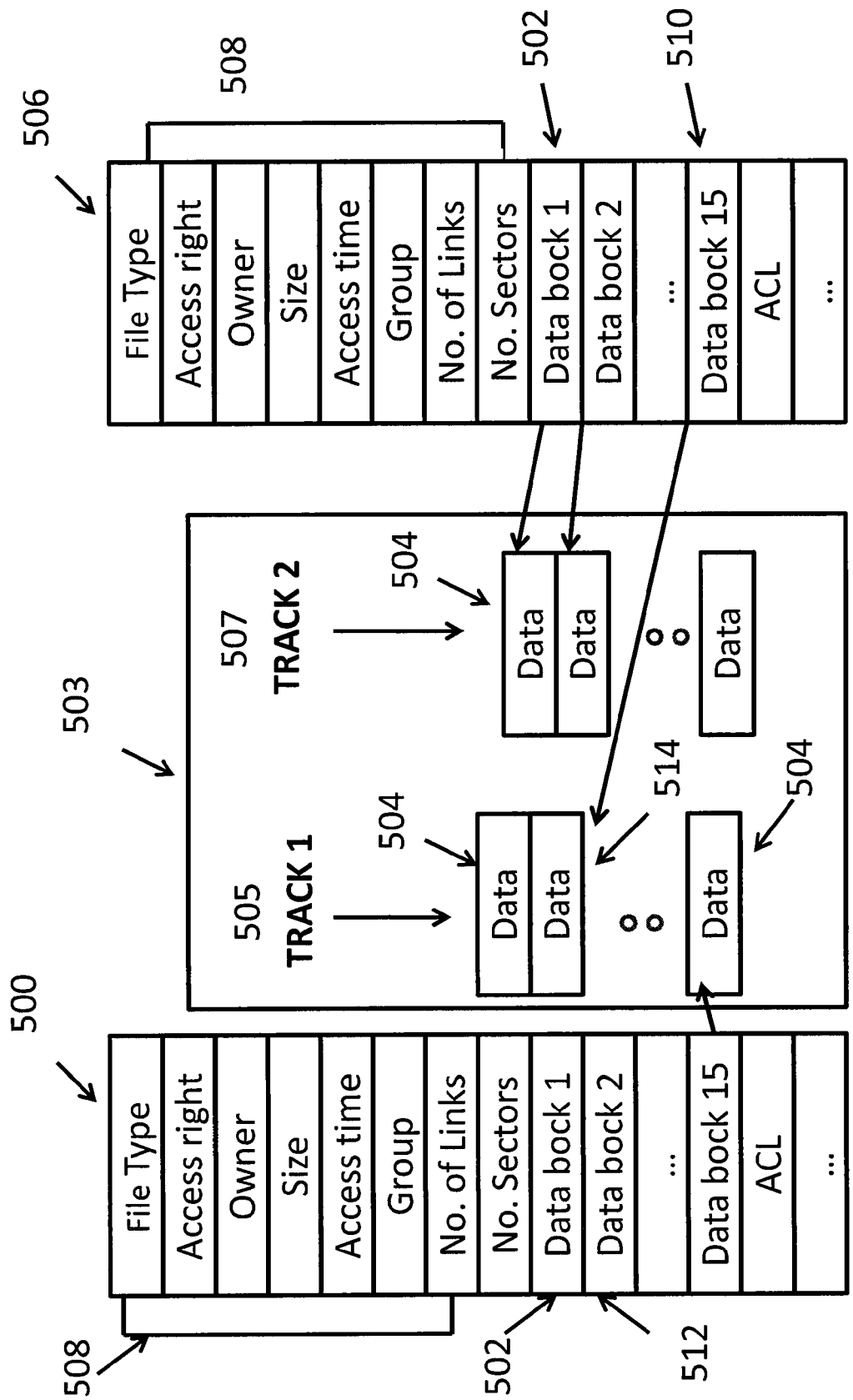
FIG. 5 is a conceptional diagram of two modes, each having a reference pointer to a deduplicated data block.

The structure of a deduplicated storage device is depicted in more detail in FIG. 5. Specifically, FIG. 5 depicts two modes 500 and 506 that are used by the file system 350 to organize and store data. FIG. 5 also depicts a storage device 503 that has two tracks 505 and 507. Both tracks 505 and 507 have a series of data blocks 504, which are depicted as a set of linear blocks 504. However, the blocks may be arranged in any suitable fashion and commonly are arranged as radial sectors placed along circular tracks of a disk, and those of skill in the art will recognize that the actual physical arrangement of the data blocks 504 will vary according to the structure and type of 504 the storage device. Those of skill in the art will also recognize that typically, the file system 350 operates on the file data blocks 502, and that although these file data blocks 502 point to the physical location of the data block 504 on the storage device 503, the file system 350 itself is not aware of the actual physical location of the data blocks 504. The storage layer 280 and device driver layer 285 translate the references in the file data blocks 502 into the physical location of the data blocks 504, such as the track and physical block location of the data blocks 504.

Each mode 500 and 506 represents a different file within the file system 350. As shown in FIG. 5 modes 500 and 506 include a block of metadata 508, and a series of file data blocks 502. As also shown in FIG. 5, each of the file data blocks 502 points to the physical location of a data block 504 stored on the storage device 503.

FIG. 5 depicts the data blocks 504 as contiguous arrays of data blocks in the two separate tracks 505 and 507. As storage devices such as storage device 503 typically preallocate data blocks 504 for storing data for a file mode, such as modes 500 and 506, it is typically, but not always, the case that the data blocks 504 used to store data for the file data blocks 502 are clustered together in a sequential order that is similar to the sequential order of the file data blocks 502. The deduplication process may disrupt this sequential coordination between the file data blocks 502 and the physical data blocks 504, with the result being that reading data blocks 504 for a file may require an additional head seek operation, which can increase the time required to read file data from the storage device 503. In the conceptual schematic of FIG. 5, the mode 506 includes a file data block 510 that points to a data block 514 that is also pointed to by file data block 502 within mode 500. The data block 514 is a deduplicated data block that is referenced by both modes 500 and 506 and that it is physically located within track 1, 505, of the device 503. Thus, mode 506 has been processed by the deduplication layer 275 and the data block that was referenced by the file data block 510 of the mode 506 was identified as being a duplicate of the data in the data block referenced by file data block 512 of mode 500. Upon detecting the duplicated data block, the deduplication layer 275 sets the pointer of file data block 510 to point to the same physical location on the storage device 503 as does the file data block 512. Specifically, FIG. 5 shows that the file data block 510 points to the physical data block 514 which is already referenced by file data block 512 of mode 500. As such, the storage device 503 allocates only the single deduplicated data block 514 for both file data blocks 512 and 510.

FIG. 5 further illustrates conceptually that the data deduplication process carried out by the data deduplication layer 275 disrupts any coordination between the sequential order of the file data blocks 502 and the sequential order of the physical data blocks 504. For example, in mode 506 there are a series of fifteen (not all shown) file data blocks 502, each one sequentially numbered. The sequential numbering of these file data blocks 502 allows the mode 506 to organize the blocks of data into sequential blocks that, when combined, provide some or all the data in the file and organize that data into the proper sequence. When the data blocks 502 of the mode 506 are written onto the storage device 503, the storage layer 280 can receive the different file data blocks 502 and can sequentially record the data for those file blocks 502 into a sequential set of the data blocks 504 in Track 2 of storage device 503. The recording of data into sequential data blocks 504 optimizes the speed at which data in the data blocks 504 can be written to and read from the device 503. By recording the data blocks 504 sequentially and in the same track on a disk, the disk device is only required to seek to a single track on the disk and into that track a sequence of data blocks 504 can be written or alternatively read. By reducing the need to move the recording head to different tracks, the storage layer 280 reduces the delay that arises when a seek operation occurs. This results in greater overall global throughput as each individual seek operation can add milliseconds to the disk access operation. Reducing the number of seek operations can improve the overall performance of the storage system 120.

Data deduplication can interfere with the ability of a read operation to operate with a reduced number of seek operations. This is illustrated in FIG. 5 by the data block 510 pointing to the deduplicated data block 514 in Track 1, 505. The data deduplication process directs the file data block 510 to point to a data block 514 that was recorded on the storage device 503 as part of the recording of mode 500. Consequently, there is a high probability that the data block 514 is not in sequence with the other data blocks 504 associated with mode 506 and very possibly is stored in a different data track, as in the example illustrated in FIG. 5. This disruption between the sequential order of the file data blocks 502 and the physical data blocks 504 can increase the latency that occurs during disk read operations.

As the deduplication layer 275 processes the files in the file system 350 and deduplicates data blocks, such as the data block 514, the deduplication layer 275 builds a de-duplication data map, such as the de-duplication data map 290 depicted in FIG. 2. In one embodiment, each time the deduplication layer 275 detects a data block 504 having a check sum that matches a data block 504 already stored on the disk 125, the deduplication layer 275 adds an entry, or updates an existing entry, in the de-duplication data map 290 thus having a mapping process for generating the de-duplication data map 290.

In the systems and methods described herein. The deduplication data map 290 stores the physical location of deduplicated data blocks, such as deduplicated data block 514, and notes the number of times that a respective deduplicated data block 514 has been referenced by other file blocks 502.

Figure 6:
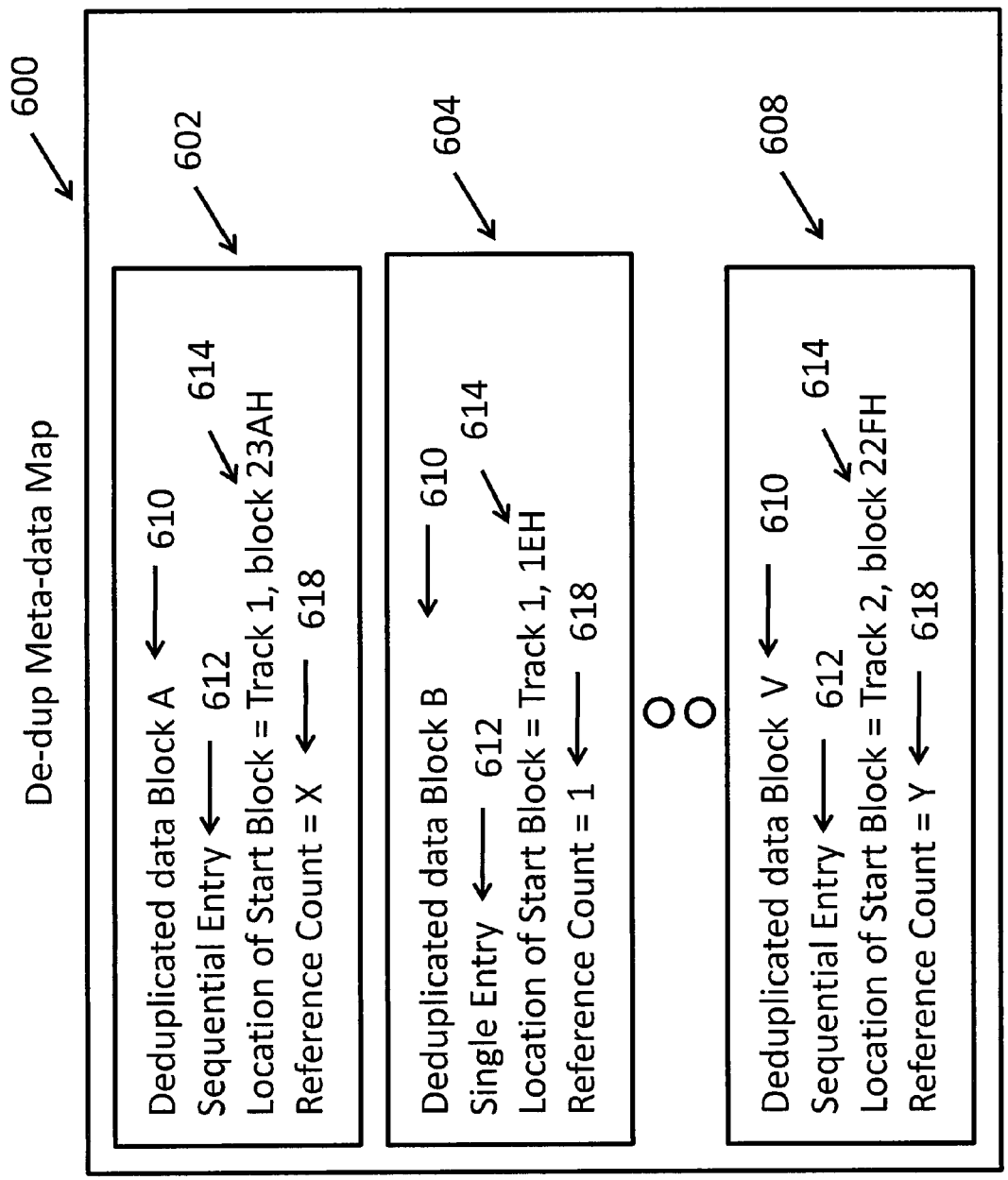
FIG. 6 shows a conceptual diagram of an exemplary de-duplication data map structure.

FIG. 6 depicts one embodiment of a deduplication data map of the type that can be stored in the memory 240 and optionally in the random access memory 245 of the storage system 120 depicted in FIG. 2. In one embodiment, the deduplication data map 600 has information for identifying a deduplicated data block, whether it is a block, sector, or some other structure, on a storage device. As shown in FIG. 6, the deduplication data map 600 includes three deduplication file block entries, 602, 604 and 608. Each data block entry represents a deduplicated data block or a sequence of deduplicated data blocks 514 stored on a storage device 125 and referenced by two or more file blocks such as the file blocks 512 and 510 depicted in FIG. 5. The de-duplication data map 600 stores a list of those deduplicated data blocks contained on the storage device which represent deduplicated data blocks, such as data block 514, serving as data storage for multiple different file blocks 502, typically being file blocks in different files. As shown in FIG. 6, each deduplicated data block entry includes a sequence flag 612 that indicates whether the deduplicated data block 610 is a single data block or a sequence of deduplicated data blocks. For example, data block entry 602 includes an entry flag 612 that indicates the data block entry 602 records the presence of a sequence of deduplicated data blocks stored on the storage device 125. The physical location of the start of this sequence of deduplicated data blocks is marked in field 614 by an address that represents the location of the start block of that sequence of deduplicated data blocks. However, any indication of the physical location of the deduplicated data may be employed, and the type of indication used will vary, at least in part, based on the type of storage device that keeps that deduplicated data. In the depicted example, the field 614 notes that the starting block of the sequence is physically located in Track 1, at Block 23AH of the Track 1. As such, the sequential entry flag 612 indicates there is a sequence of deduplicated data blocks and optionally indicates the number of deduplicated data blocks in that sequence. The location of blocks in that sequence can be found by locating the start block indicated in Field 614 and moving in sequence through the next set of data blocks until the number of data blocks indicated in Field 612 has been read. As further shown in FIG. 6, each data block entry field 602, 604 and 608 includes a reference count field 618. The reference count field 618 indicates the number of file data blocks 502 that reference the respective deduplicated data block or the sequence of deduplicated data blocks. For example, the data block entry 602 includes a reference count that indicates that X file blocks referenced the data stored in data block A. Similarly, the data block entry 604 has a reference count 618 that indicates one file block references data block B associated with entries 604. Thus, data block entry 604 may represent the deduplicated data blocks 514 depicted in FIG. 5, that is a single deduplicated block in Track 1 of disk 503 and, according to the de-duplicated data table 600, at location 1EH with a reference count of 1, representing that file data block 510 of mode 506 is the only file data block that has been redirected to reference data block 514. The reference count field 618 may be a single field when the Field 618 stores a number representative of the number of file data blocks 502 that reference the respective deduplicated data block. The reference field 615 may be an array structure when the block entry is for a sequence of deduplicated data blocks, with members of the array storing numbers that represent the number of file data blocks 502 that reference respective block is the sequence. Reference count filed may be a single field for a single entry and an array for a sequential entry.

The deduplicated meta-data map 600 provides the storage layer 280 and the file system 350 with a map of the areas of the storage disk 503 that contain deduplicated data and further provides the storage layer 280 and the file system 350 with reference count data indicating how heavily copied or referenced the deduplicated data blocks are within the file system 350. It will also be apparent, that the deduplicated data map 600 indicates the location of non-deduplicated data on the disk 125.

Figure 7:
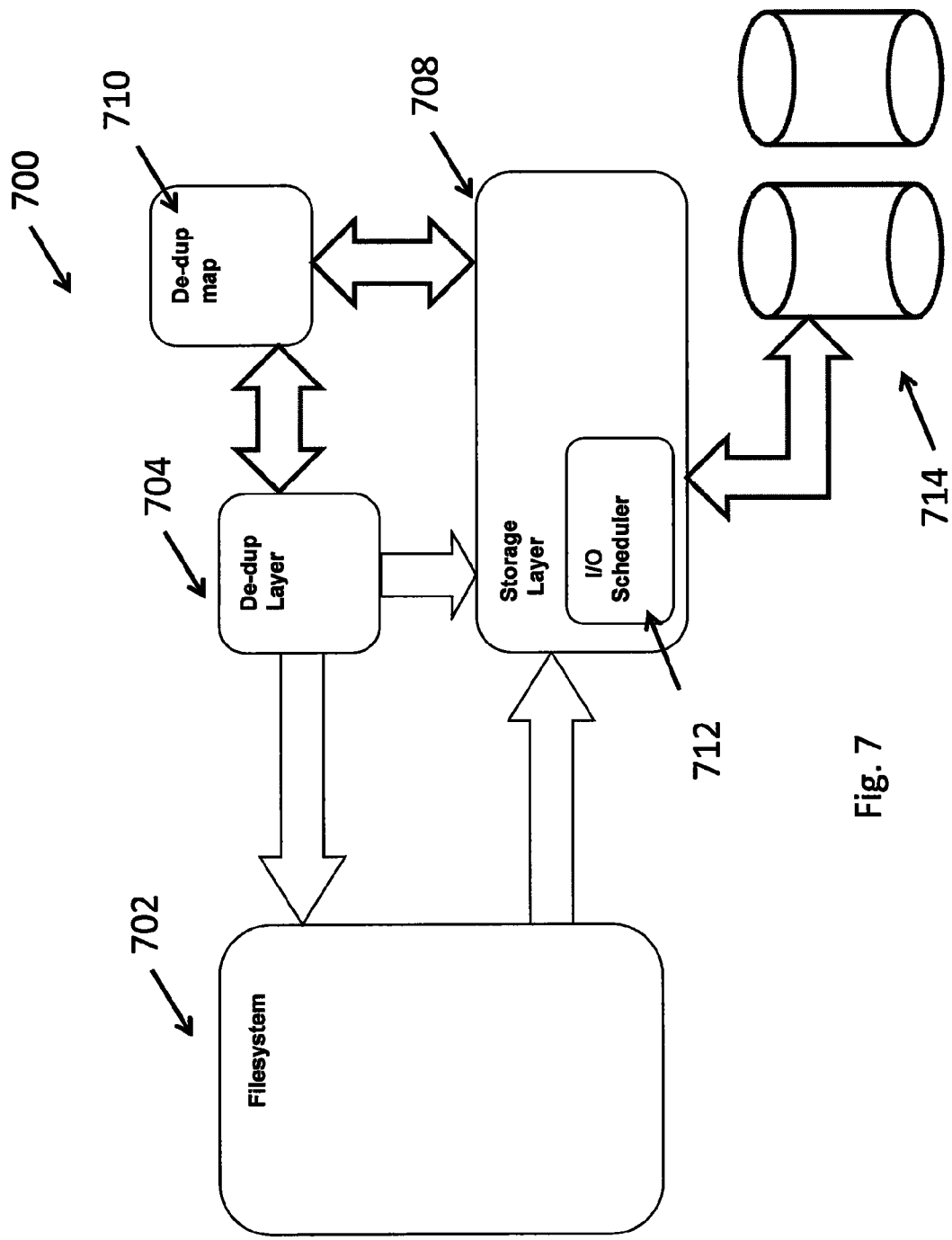
FIG. 7 is a schematic block diagram of a system for using deduplication data to schedule I/O access operations.

Once the deduplicated data map 600 is created, it can be stored into memory for use by the file system 350 and storage layer 280 when scheduling requests to access data stored on the storage device 125. FIG. 7 depicts a functional block diagram of a storage system 700 that will use the deduplicated meta-data of the type discussed with reference to FIG. 6, when coordinating and scheduling disk access operations. In particular, FIG. 7 depicts a storage system 700 that provides deduplication aware scheduling of requests to access data blocks stored within primary storage. In particular, FIG. 7 depicts a file system 702, a deduplication layer 704, a de-duplication data map 710, a storage layer 708, an I/O scheduler 712 and two storage disks 714. As described above the deduplication layer 704 can perform deduplication of the data stored on the storage disks 714 by accessing files maintained by file system 702 and eliminating from the disks 714, data blocks that are redundantly stored. As further discussed above, during the deduplication process the deduplication layer 704 can create the de-duplication data map 710 which can be stored in memory. During normal operation of the file system 702, the file system 702 makes requests of the storage layer 708 to access files stored on the disks 714. The requests ask to read a sequence of data blocks stored on the storage devices 714. The file system 702 passes the request to the storage layer 708, and it is typically the case that while the storage layer 708 is fulfilling a request, a series of other requests will come into the storage layer 708. These additional requests are queued by the storage layer 708 and will be fulfilled once the storage layer 708 has sufficient operating bandwidth.

To prepare the requests for handling by the storage layer 708, the storage layer 708 employs an I/O scheduler 712 to organize and prioritize the multiple pending requests into a dispatch queue maintained by the I/O scheduler 712.

The I/O scheduler 712 sorts the disc based I/O operations to improve the response time of the storage system 120. Typically, the I/O scheduler 712 will employ a dispatch processor that implements a process for scheduling I/O requests. The dispatch process may be a software process, a hardware device or a combination of the hardware and software. The dispatch processor will consider setting deadlines for responding to the I/O requests, as well as consider the operational fairness of the request or a priority/guarantee for a workload associated with the I/O request. A workload may be, is one embodiment, one or more I/O requests generated over a period of time and associated with an application thread or some other process. Additionally, the depicted I/O scheduler 712 will analyze the deduplication data associated with the different requests to prioritize the different requests based, at least in part, on the likelihood the deduplicated data will increase the number of head seek operations required of the storage disks 714, and optionally on the likelihood that any additional seek operations would effect the global throughput of the storage system 700. However, it will be apparent to those of skill in the art, that the I/O scheduler 712 may use the deduplication data stored in map 710 to adjust priorities in any manner suitable for the application being addressed, and considerations of head seek operations, global throughput, fairness and other factors are merely examples of the types of factors the I/O scheduler 712 can analyze when setting request priority. Thus, in some practices, the I/O scheduler 712 may use the deduplication data to increase the priority of a request in other applications. The I/O scheduler 712 may decrease the priority of the same request. The use of the deduplication data will vary with the application, and any and all such uses fall within the scope of the invention.

In one practice, the de-duplication data map 710 allows the storage layer 708 to determine whether a query request includes a request to read de-duplicated data. This allows the I/O scheduler 712 to distinguish between non-sequential block requests that request non-deduplicated data and non-sequential block request that are seeking de-duplicated data. As discussed above, a non-sequential request for a block of de-duplicated data may represent a situation in which the file system 350 has requested sequential blocks from a particular file, but some of those blocks have been de-duplicated and moved to a location that is outside of the physical sequence of the other blocks in the file. The I/O scheduler 712 can, prioritize the request for de-duplicated data differently from requests for non-deduplicated data, even if the non-deduplicated data includes non-sequential data blocks. The dispatch processor of the scheduler 712 can assign different dispatch priorities based on the detection of de-duplicated data. In some practices, the dispatch processor can prioritize the order of servicing query request based, at least in part, on company or otherwise analyzing data blocks in one or more query requests to be de-duplicated data blocks in the map.

Additionally, as discussed above with reference to FIG. 6, the de-duplicated data map 710 provides a record of the de-duplicated blocks that exist on a disk 714 and in the tracks of the disk 714. This layout information allows the I/O scheduler 712 to determine the relative extent of de-duplication that has taken place on a disk, or even within a particular track of a disk. For example, the I/O scheduler 712 can, in one practice, from time to time determine the percentage of deduplication by, among other ways, dividing the number to deduplicated data blocks found in the map 710 by the total number of blocks in the storage disks 714. Additionally and optionally, the I/O scheduler can determine the average length of deduplicated sequences by taking the average of the sequences stored in the deduplication map 710. Other quantitative analyses can be undertaken. This data allows the dispatch processor of the I/O scheduler 712 to determine whether a particular request for a set of de-duplicated blocks includes a request for a set of sequential deduplicated data blocks that is a relatively large set of deduplicated data blocks for the disk 714 or relatively small. The dispatch processor of the I/O scheduler 712 can then determine whether the request requires a head seek operation to read a relatively small set of deduplicated data blocks or a relatively large set. The dispatch processor will use this determination to set the priority for the query request, typically setting the priority such that a query request that causes a seek operation to a different track to read a sequence of de-duplicated blocks, particularly if that sequence is above a certain minimum threshold of blocks, will have a higher priority than a query request that will cause a seek operation to read a set of de-duplicated blocks below the minimum threshold. However, the I/O scheduler 712 may also use the de-duplication data map 710 to identify a request for a single de-duplicated data block which requires a seek operation. In this case, the I/O scheduler 712 may set the priority for this single de-duplicated block to one that is more in line with the priority set for the other blocks in the request, thereby reducing the likelihood that the de-duplicated block will have to wait an extended period of time to be serviced and thereby prevent the process making the query request from waiting for the de-duplicated block for an extensive delay period. In any case, the systems and methods described herein provide the I/O scheduler 712 with de-duplication data that the dispatch processor of the I/O scheduler 712 may use to adjust the priority settings, optionally using the de-duplication data to set priorities that are more fair and efficient, or for any other purposes.

In one optional and exemplary embodiment, the systems and methods described herein determine a minimum threshold value which represents the minimum number of sequential blocks that the deduplication layer 704 has generally been requiring before performing a de-duplication operation. Thus, the de-duplication process will identify duplicate data blocks on the storage device, and test the sequence length of the identified duplicate data blocks against a threshold value. Once a sequence having a length at or greater to a threshold value is found, the deduplication operation will trigger and the data blocks will be deduplicated. In one practice the I/O scheduler 712 determines the minimum threshold value used by the deduplication process by requesting the minimum threshold information from the de-duplication layer 704, by having the deduplication layer store the minimum threshold value in the deduplication map, by querying the storage system administrator, or by any other suitable manner. In other practices, the minimum threshold value is determined by analyzing the lengths of sequences in the de-duplication map 710 and determining the minimum sequences of blocks being deduplicated by the system. Thus, the minimum threshold value may be a parameter provided to the I/O scheduler or it may be calculated by the I/O schedules such as by analysis of lengths of sequences in the de-duplication map.

In one practice, the I/O scheduler 712 considers the deduplication context of the storage disk, including the minimum threshold for de-duplication, for each request being scheduled. In a first step, the I/O scheduler 712 has a threshold process that determines the size of the sequence of deduplicated blocks, if any, in a particular request relative the minimum threshold value that is set for the deduplication layer 704. This value is referred to herein as the Relative Threshold value.

Relative Threshold=Minimum Threshold−Actual Threshold(Unit is number of blocks).

The Actual Threshold is the size of the sequence of de-duplicated blocks on a track that exists in a particular request being handled by the storage layer 708.

In operation, other elements may perform a threshold process to determine the Relative Threshold and for example either the storage layer 708 determines the Relative Threshold by querying the de-duplication data map 710 about the set of requested blocks, or the file system 702 queries the de-duplication map 710 with the proposed request and marks the de-duplicated blocks in the request before passing the request to the storage layer 708. In either case, the de-duplicated blocks in the request are identified. For the identified blocks the map 710 returns a tuple: {the number of blocks matched, the index into the meta-data map 710 corresponding to the starting block of the matched sequence, and the location on disk of the first block that matched}.

For example: Deduplication data map 710 has an entry, flagged as a sequence of length eight blocks, that identifies that the following set of sequential de-duplicated blocks as present on particular track: A B C D E F G H.

The I/O scheduler 712 then gets a request for the following two sequences of blocks:

Case 1. C D E F: Here the I/O scheduler 712 does a match of request "C D E F" with data in the de-duplication data map 710 and determines that the "Actual Threshold" value is 4, the number of sequential deduplicated blocks in the map 710 that match the sequence of blocks in the request.

Case 2. A B C D E F G H: here the I/O scheduler 712 does a match with de-duplication data map 710 and sets the Actual Threshold value to 8.

As noted above, the Relative Thresholds are determined by comparing the length of the block sequences in a request with the minimum threshold applied by the deduplication layer.

Once the Relative Threshold for a request is determined, the I/O scheduler 712 can apply a Dispatch Criteria to one or both requests to help set the priority for dispatching the requests.

In one practice the I/O scheduler 712 applies a Dispatch Criteria that balances the Relative Threshold of a request with a Relative Priority value and an Age of Request value.

Specifically, in one example the Dispatch Criteria can be expressed by:

Dispatch Criteria=(Standard Variation Threshold/ Relative Threshold)+Relative Priority+Age of the Request IO As discussed above, the Standard Variation Threshold can, in one practice, be derived by a disk analysis process for considering a set of workloads, and calculating each workload's variation/difference from Minimum Threshold value, taking the average of the measured variations, thereby determining the typical sequence of deduplicated blocks that will be seen in a typical request.

The Standard Variation Threshold may be derived in practice as follows:

1. Calculate Relative Threshold values for multiple sequence of blocks for a workload.
2. Calculate average of all such Relative Threshold values of the workload.
3. Repeat the Step 1 and Step 2 for different workloads.
4. Take an average of all such values from Step 3.

The above four steps analyze the disk layout for a few model workloads, and preferably the selected model workloads are typical for the storage application. The value for the Standard Variation Threshold should therefore relate to the workloads the storage system 700 expects to service. Thus, the Dispatch Criteria can compare the number of sequential deduplicated blocks in a pending request, the Relative Threshold, with the standard number of deduplicated blocks in a typical request, the Standard Variation, to get a measure of the relative efficiency of the pending request as compared to the typical request. If the comparison indicates that a seek operation for the pending request would be as or more efficient than the typical request, the I/O scheduler 712 may schedule the pending request ahead of another request, even if that other request is for blocks in the present track, as the overall effect of servicing the pending request should not effect the global throughput of the storage system 700. In this way the I/O scheduler 712 can employ such a disk analysis process to increase the priority of a request for deduplicated data that requires a seek operation without reducing the global throughput of the storage system 700.

In an optional practice, the I/O scheduler 712 may also consider the Relative Priority and the Age of the Request when adjusting the Dispatch Criteria. The Relative Priority can be the priority of a set of deduplicated data blocks based, at least in part, on the number of times that the blocks have been requested by one or more processes, either at the same time or substantially the same time. The Relative Priority of a sequence of blocks can be calculated, in one practice, as the sum of individual block's Relative Priority values. The Relative Priority of a non-duplicated block can, in some practices, be set to zero. The Reference Count of a deduplicated block may also be factored into the Relative Priority value, typically by increasing its priority, but those of skill in the art can use any suitable technique to adjust the Relative Priority based on the Reference Count.

The Age of the Request IO may be a standard measure of request age and typically is a value that represents the age of the request. The Age of the Request can be determined by setting a time within the processor to provide a request timer to calculate the time the request has been pending since requested by the file system 702. By considering the age of the request, the I/O scheduler 712 can override a scheduling process that has delayed repeatedly handling an aging request in favor of newly arrived requests.

Typically, the I/O scheduler 712 applies the Dispatch Criteria calculation to both dedup and no-dedup blocks before seeking to a different track.

The following example of the dispatch request adjusting the priority of incoming requests is provide as an illustration only, and is not to be seen as limiting in any way. In one example, the: I/O scheduler 712 gets the following sequence of request from Filesystem.

First Sequential Blocks IO in Track 1
First Dedup Block or Blocks IO in Track 2
Second Sequential Blocks IO in Track 1
Second Dedup Block or Blocks IO in Track 2

Without applying the Dispatch Criteria, the I/O scheduler 712 would typically merge the First Sequential Blocks IO in Track 1 with Second Sequential Blocks IO in Track 1, as both requests are for blocks within the same track and therefore there is no need to do seek to a different track.

However, upon applying the Dispatch Criteria, the sequence of operations may change. For example, after the IO operation is completed for the First Sequential Blocks IO in Track 1, the Dispatch Criteria calculation is applied to both of the requests; the First Dedup Block or Blocks IO in Track 2 and the Second Sequential Blocks IO in Track 1. As discussed above, if the Dispatch Criteria, given the level and type of deduplication applied to the disk, determines that the First Dedup Block or Blocks IO in Track 2 request would be similarly efficient or more efficient than a typical request, the Distpatch Criteria can raise the priority of the First Dedup Block or Blocks IO in Track 2 and that can be chosen for the next operation.

Figure 8:
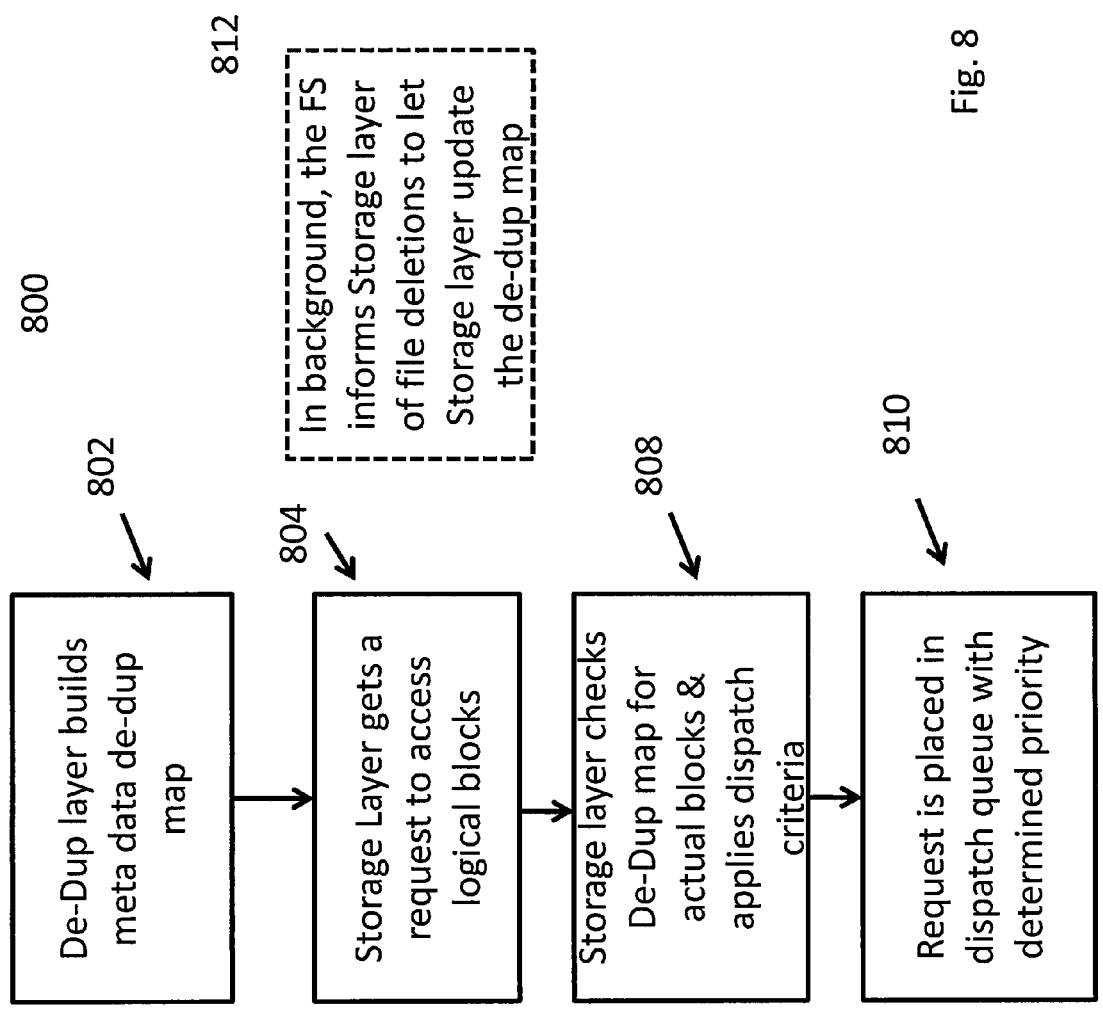
FIG. 8 is a flowchart of a method for scheduling query requests for data stored on a de-duplicated storage system.

Thus, the Dispatch Criteria can elevate a deduplicated block request to another track ahead of a non-deduplicated request for blocks existing in the current track. FIG. 8 depicts a process 800 for carrying out deduplication aware disk access operations. In particular, FIG. 8 depicts a process 800 that starts at Step 802 where the deduplication layer builds a meta-data deduplication map for storing information that represents the layout of deduplicated data within the tracks and blocks of the storage device. After Step 802 the process 800 proceeds to step 804 wherein a storage layer gets a request, typically from a file system to access certain data blocks stored on the storage disks. In step 808, the storage layer checks the meta-data deduplication map against the requested blocks to determine the actual number of sequential deduplicated data blocks within a specific request, wherein the actual number of blocks is the number of blocks in a request above the minimum number of data blocks required by the deduplication process. Once the actual number of blocks is determined, the process 800 in step 808 then applies a dispatch criteria which will schedule the requests in an order that will minimize the number of seek operations, by for example prioritizing those requests with relatively large numbers of sequential deduplicated data blocks ahead of those requests that contain a single deduplicated data block, or a small number of sequential deduplicated data blocks. In this way, the scheduler amortizes the seek operation across multiple sequentially read data blocks. This improves overall storage performance. Once the process 800 applies the dispatch criteria, the process proceeds to step 910 wherein the request is placed in a dispatch queue with a determined priority relative to other requests within the dispatch queue.

As FIG. 8 also shows, the file system, operating in the background as the storage layer operates, informs the storage layer of file deletions. In this way the file system allows the storage layer or the deduplication layer to become aware of files being deleted from the file system, and to check to see if those deleted files had earlier referenced deduplication data blocks. If a file referencing a deduplicated data block is deleted, the storage layer will reduce the reference count for that respective deduplicated data block and update the data de-duplicated map.

Some embodiments of the above described may be conveniently implemented using a conventional general purpose or a specialized digital computer or microprocessor programmed according to the teachings herein, as will be apparent to those skilled in the computer art. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in. Additionally, the storage medium may be a hybrid system that stored data across different types of media, such as flash media and disc media. Optionally, the different media may be organized into a hybrid storage aggregate. In some embodiments different media types may be prioritized over other media types, such as the flash media may be prioritized to store data or supply data ahead of hard disk storage media or different workloads may be supported by different media types, optionally based on characteristics of the respective workloads. Additionally, the system may be organized into modules and supported on blades configured to carry out the storage operations described herein.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, modules, circuits, techniques, or method steps of embodiments described herein may be implemented as electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. In general, functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

I claim:

1. A method for accessing storage objects having de-duplicated data, the method comprising
   providing, by a storage device, a de-duplication data map comprising information that identifies a de-duplicated data block;
   identifying, by the storage device, a storage location of the identified de-duplicated data block; and
   scheduling, by the storage device, a query request to read data blocks from the storage device-by comparing data blocks in the query request to the de-duplicated data blocks identified in the de-duplication map and prioritizing the order of servicing the query request as a function of the number of sequential de-duplicated data blocks within the query request.

2. The method according to claim 1, further comprising generating, by the storage device, the de-duplication data map by applying a de-duplication process to the identified storage location and recording the identified storage location of de-duplicated data blocks as the de-duplication process removes duplicate data blocks from the identified storage location.

3. The method according to claim 1, further comprising storing, by the storage device, in the de-duplication data map, for a respective de-duplicated data block, a status flag indicating whether the block is a single entry or a sequence of de-duplicated blocks, a reference count indicating the number of data blocks referencing the de-duplicated block and a physical location of a block or sequence of blocks.

4. The method according to claim 1, further comprising selecting, by the storage device, a set of model workloads, each having one or more query requests, and comparing the one or more query requests to the de-duplication data map to determine characteristics representative of a typical number of de-duplicated sequential data blocks in a request made by a model workload.

5. The method according to claim 1, further comprising determining, by the storage device, a relative priority value representative of a number of times a de-duplicated data block has been requested within a set period of time.

6. The method as set forth in claim 1 further comprising:
   comparing, by the data storage device, the number of identified de-duplicated data blocks in a request to a minimum threshold number representative of a minimum number of sequential data blocks to trigger a data de-duplication operation;

selecting, by the data storage device, a set of model workloads, each having one or more query requests and comparing the one or more query requests to the de-duplication data map to determine characteristics representative of a typical number of de-duplicated sequential data blocks for query requests in the model workloads;

prioritizing, by the data storage device, a query request as a function of comparison between the number of de-duplicated sequential data blocks in a query request and the typical number of de-duplicated sequential data blocks; and providing, by the data storage device, a relative priority value representative of a number of requests made by a file system for a particular data block.

7. The method as set forth in claim 1 wherein the scheduling further comprises analyzing, by the data storage device, the identified de-duplicated data block in the query request and scheduling the respective query requests for dispatch as a function of the de-duplicated data blocks in the query request.

8. The method as set forth in claim 1 further comprising:
comparing, by the data storage device, data blocks in a query request with de-duplicated data blocks in the provided de-duplication data map and making data blocks in the query request that match de-duplicated data blocks in the provided de-duplication data map;

detecting, by the data storage device, a file being deleted and editing data in the provided de-duplication data map to remove from the provided de-duplication data map, references to the data blocks of the deleted file; and reducing, by the data storage device, a number representative of a number of file data blocks that reference a de-duplicated data block in the provided de-duplicated data map.

9. The method as set forth in claim 1 wherein the provided de-duplication data map stores data representative of a physical location of a disk drive of a de-duplicated data block.

10. A non-transitory computer readable medium having stored thereon instructions for accessing storage objects stored on a storage device having de-duplicated data comprising machine executable code which when executed by at least one processor, causes the processor to perform steps comprising:
providing a de-duplication data map comprising information that identifies a de-duplicated data block;

identifying a storage location of the identified de-duplicated data block; and scheduling a query request to read data blocks from a storage device by comparing data blocks in the query request to the de-duplicated data blocks identified in the de-duplication map and prioritizing the order of servicing the query request as a function of the number of sequential de-duplicated data blocks within the query request.

11. The medium as set forth in claim 10 further comprising:
generating the de-duplication data map by applying a de-duplication process to the identified storage location and recording the identified storage location of de-duplicated data blocks as the de-duplication process removes duplicate data blocks from the identified storage location;

storing in the de-duplication data map, for a respective de-duplicated data block, a status flag indicating whether the block is a single entry or a sequence of de-duplicated blocks, a reference count indicating the number of data blocks referencing the de-duplicated block and a physical location of a block or sequence of blocks;

selecting a set of model workloads, each having one or more query requests, and comparing the one or more query requests to the de-duplication data map to determine characteristics representative of a typical number of de-duplicated sequential data blocks in a request made by a model workload;

determining a relative priority value representative of a number of times a de-duplicated data block has been requested within a set period of time; and comparing the number of identified de-duplicated data blocks in a request to a minimum threshold number representative of a minimum number of sequential data blocks to trigger a data de-duplication operation.

12. The medium as set forth in claim 10 further comprising:
selecting a set of model workloads, each having one or more query requests and comparing the one or more query requests to the de-duplication data map to determine characteristics representative of a typical number of de-duplicated sequential data blocks for query requests in the model workloads; and prioritizing a query request as a function of comparison between the number of de-duplicated sequential data blocks in a query request and the typical number of de-duplicated sequential data blocks.

13. The medium as set forth in claim 10 wherein the scheduling further comprises analyzing the identified de-duplicated data block in the query request and scheduling the respective query requests for dispatch as a function of the de-duplicated data blocks in the query request.

14. The medium as set forth in claim 10 further comprising:
providing a relative priority value representative of a number of requests made by a file system for a particular data block;

comparing data blocks in a query request with de-duplicated data blocks in the provided de-duplication data map and making data blocks in the query request that match de-duplicated data blocks in the provided de-duplication data map;

detecting a file being deleted and editing data in the provided de-duplication data map to remove from the provided de-duplication data map, references to the data blocks of the deleted file; and reducing a number representative of a number of file data blocks that reference a de-duplicated data block in the provided de-duplicated data map.

15. The medium as set forth in claim 10 wherein the provided de-duplication data map stores data representative of a physical location of a disk drive of a de-duplicated data block.

16. A storage device comprising:
at least one processor; and
a memory coupled to the at least one processor which is configured to execute programmed instructions stored in the memory comprising:
providing a de-duplication data map comprising information that identifies a de-duplicated data block;

identifying a storage location of the identified de-duplicated data block; and scheduling a query request to read data blocks from a storage device by comparing data blocks in the query request to the de-duplicated data blocks identified in the de-duplication map and prioritizing the order of servicing the query request as a function of the number of sequential de-duplicated data blocks within the query request.

17. The device as set forth in claim 16 wherein the at least one processor is further configured to execute programmed instructions stored in the memory further comprising:

generating the de-duplication data map by applying a de-duplication process to the identified storage location and recording the identified storage location of de-duplicated data blocks as the de-duplication process removes duplicate data blocks from the identified storage location;

storing in the de-duplication data map, for a respective de-duplicated data block, a status flag indicating whether the block is a single entry or a sequence of de-duplicated blocks, a reference count indicating the number of data blocks referencing the de-duplicated block and a physical location of a block or sequence of blocks;

selecting a set of model workloads, each having one or more query requests, and comparing the one or more query requests to the de-duplication data map to determine characteristics representative of a typical number of de-duplicated sequential data blocks in a request made by a model workload;

determining a relative priority value representative of a number of times a de-duplicated data block has been requested within a set period of time; and comparing the number of identified de-duplicated data blocks in a request to a minimum threshold number representative of a minimum number of sequential data blocks to trigger a data de-duplication operation.

18. The device as set forth in claim 16 wherein the at least one processor is further configured to execute programmed instructions stored in the memory further comprising:

selecting a set of model workloads, each having one or more query requests and comparing the one or more query requests to the de-duplication data map to determine characteristics representative of a typical number of de-duplicated sequential data blocks for query requests in the model workloads; and prioritizing a query request as a function of comparison between the number of de-duplicated sequential data blocks in a query request and the typical number of de-duplicated sequential data blocks.

19. The device as set forth in claim 16 wherein the at least one processor is further configured to execute programmed instructions stored in the memory for the scheduling further comprises analyzing the identified de-duplicated data block in the query request and scheduling the respective query requests for dispatch as a function of the de-duplicated data blocks in the query request.

20. The device as set forth in claim 16 wherein the at least one processor is further configured to execute programmed instructions stored in the memory further comprising:

providing a relative priority value representative of a number of requests made by a file system for a particular data block;

comparing data blocks in a query request with de-duplicated data blocks in the provided de-duplication data map and making data blocks in the query request that match de-duplicated data blocks in the provided de-duplication data map;

detecting a file being deleted and editing data in the provided de-duplication data map to remove from the provided de-duplication data map, references to the data blocks of the deleted file; and reducing a number representative of a number of file data blocks that reference a de-duplicated data block in the provided de-duplicated data map.

21. The device as set forth in claim 16 wherein the provided de-duplication data map stores data representative of a physical location of a disk drive of a de-duplicated data block.

* * * * *